Jan. 26, 1960   W. J. WILKIE   2,922,340
RELEASE MECHANISM FOR ORDNANCE APPARATUS AND THE LIKE
Filed Feb. 3, 1955
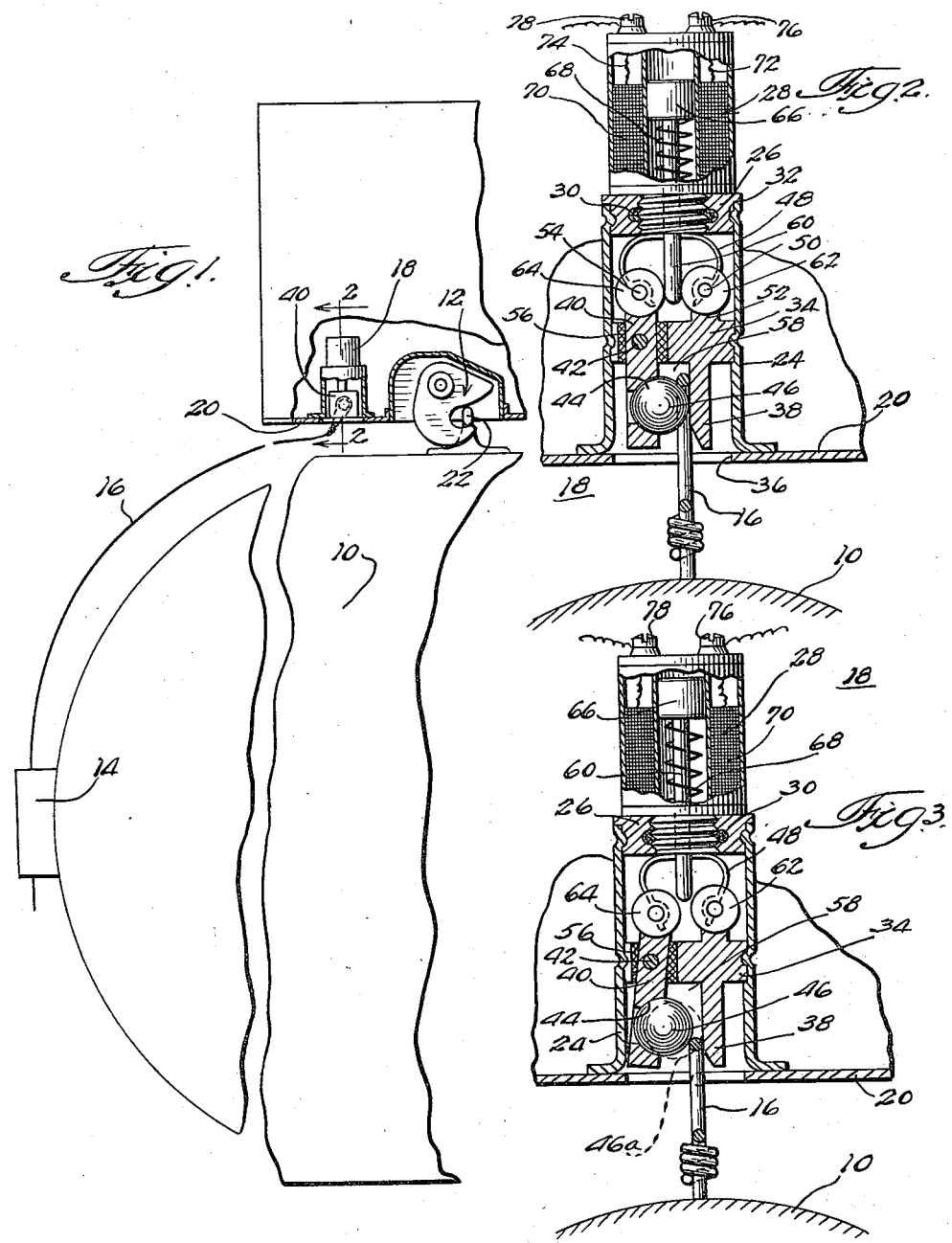
INVENTOR.
Wallace J. Wilkie.
BY
Thiess, Olsen, Mecklenburger,
von Holst & Coltman. Attys.

United States Patent Office 2,922,340
Patented Jan. 26, 1960

2,922,340

RELEASE MECHANISM FOR ORDNANCE APPARATUS AND THE LIKE

Wallace J. Wilkie, Superior Township, Washtenaw County, Mich., assignor, by mesne assignments, to Jervis Corporation, Grandville, Mich., a corporation of Michigan Application February 3, 1955, Serial No. 485,920

7 Claims. (Cl. 89—1.5)

This invention relates to an improved release mechanism and more particularly to a mechanism adapted to release or enable the release of a retained element selectively in response to the control of an operator.

It is a principal object of this invention to provide improved apparatus for selectively controlling the retention or release of a loop or ring of wire or the like.

In the utilization of ordnance stores such as bombs and rockets it is highly desirable to provide means by which the store may be rendered completely safe and not subject to accidental ignition. This is generally accomplished by providing an arming device which orients the parts of the fuse and the explosive portion of the missile only at a time determined by the requirements of the situation, preferably immediately prior to the release of the missile during an attack. If the missel is armed substantially prior to the utilization thereof a substantial danger exists that the missile will be accidentally fired or ignited through excess shock or the effects of a counter attack. This is extremely hazardous to the personnel handling the ordnance apparatus and the operators of aircraft or other missile bearing vehicles. Use of permanently armed missiles would also greatly complicate the care required in handling and storing explosive missiles.

It is therefore desirable to employ a device which selectively controls the arming of explosive missiles so that, for example, bombs carried beneath an aircraft may have an arming wire extended therefrom which is retained in fixed relationship to the aircraft. Thereby, upon release of the missile, the arming wire is withdrawn from the missile placing the various parts thereof in condition for firing at the critical time or under the critical conditions of impact or proximity.

Furthermore it is desirable that such arming apparatus be capable of remote control by a pilot or the like to selectively release the arming wire, permitting the discharge of the missile in an emergency without conditioning ahe various parts thereof for firing. For example, it is sometimes desirable or necessary to discharge missiles while over friendly territory or a portion of an airfield.

It is an object of this invention to provide an arming release mechanism for installation in a vehicle which is easy to utilize in the loading, dropping, and unloading of missiles from the vehicle.

It is another object of this invention to provide an improved arming release mechanism which may be selectively actuated to permit the discharge of a missile with or without prior arming or setting of the fuse thereof in accordance with the desires of an operator.

It is a further object of this invention to provide an improved arming release mechanism which may be selectively actuated from a remote position.

It is still another object of this invention to provide an improved arming release mechanism in which an associated arming wire may be resiliently maintained in the arming position with a force less than that required to arm the missile.

It is still another object of this invention to provide an improved release mechanism which is rugged and capable of operation under adverse mechanical and climatic conditions.

Further and additional objects of this invention will become manifest from a consideration of this description, the accompanying drawings, and the appended claims.

In one form of this invention a mechanism is provided having a fixed post and a pivotally mounted post in spaced relationship. The pivotally mounted post has one end thereof recessed to receive a ball-like member intermediate the recessed portion thereof and one end of the fixed post. A slidably mounted pin is adapted to move into engagement with the other ends of the posts whereby the ball-like member is contiguously locked between the fixed post and the recessed portion of the pivotally mounted post. The central portion of the pivotally mounted post is sealed in an aperture in the arming release mechanism whereby the recessed portion and ball-like member which retain the loop of an arming wire and are generally exposed to the atmosphere are isolated from the opposite ends of said posts which comprise the internal structure of the craft. The locking pin may be controlled by a solenoid as disclosed in the described embodiment or may be controlled by lever means, a motor, or other appropriate remote control devices.

For a more complete understanding of this invention reference will now be made to the accompanying drawing wherein:

Figure 1 is a partial plan view of one embodiment of this invention in cooperation with a missile mounting means and associated missile;

Fig. 2 is a sectional view of the embodiment of Fig. 1 taken on the line 2—2 thereof; and Fig. 3 is a sectional view of the embodiment of Fig. 1 shown in a deenergized position.

Referring now to the drawings and more particularly to Fig. 1, a missile 10 is diagrammatically shown suspended from a conventional hook mechanism 12, said missile 10 having a fuse means 14 mounted at the forward end thereof from which extends an arming wire 16. The arming wire 16 is retained within the arming mechanism 18 which comprises an illustrative embodiment of this invention. The hook mechanism 12 and the arming device 18 are permanently mounted in a portion 20 of an aircraft. The portion 20 may either be an external surface of the wing or fuselage or may be an internal structural member contained within a bomb bay or the like. Conventionally a second hook means similar to the mechanism 12 is disposed above the rearward end of the bomb 10 and is in engagement with an eyelet disposed on the rear portion of the bomb, similar to the eyelet 22. When the bomb 10 is to be released, a mechanical device is actuated permitting the hook 12 to rotate in a clockwise direction, thus releasing the missile 10 and permitting it to fall under the influence of gravity. As described above, it is important that just prior to the release of the missile over a desired target the fuse portions of the missile be so adjusted that the missile is in condition for ignition. This preconditioning of the fuse immediately prior to launching of the missile is generally termed "arming." The wire 16 is attached to a portion 14 of the fuse mechanism and is adapted to effect the arming of the fuse. In the event that emergency conditions arise and it is necessary or desirable to discharge the missile from the aircraft without conditioning the missile for explosion, the arming wire 16 must be released from its retained position within the arming mechanism 18 so that upon release of the missile 10 the arming wire 16 will fall with the missile and the missile will strike the earth in an unexploded condition. By this invention an arming release mechanism 18 is provided which may be selectively energized any number of times during a flight prior to the release of a missile, and the conditioning of the missile will be determined solely by the condition of the arming mechanism at the instant of missile release. While the positioning of the arming wire and fuse portion illustrated in Fig. 1 comprise one common construction it will be clear that the arming wire may be attached to the missile at any point on the surface thereof and one common construction includes an arming wire connected to a fuse portion disposed at the rearwardmost end of the missile. The arming release mechanism 18 provided by this invention functions equally well whether the arming wire is drawn forwardly from the mechanism as shown in Fig. 1, is withdrawn rearwardly as is true when the fuse is disposed at the rearward end of the bomb, or is withdrawn substantially vertically.

Referring now to Fig. 2, the internal details of the arming release mechanism will be described. The essential mechanical components of the mechanism 18 are contained within a housing 24 which is mounted on the aircraft portion 20. The upper end of the housing 24 is closed by a cap portion 26 having a central threaded aperture therein. The threaded aperture in the cap 26 is adapted to receive a correspondingly threaded portion of a solenoid 28. A pair of nylon slugs 30 are retained in appropriate recesses adjacent to the threaded aperture in the cap 26 whereby the solenoid 28 is locked in the desired position on the cap. The cap 26 may be retained on the housing 24 in any appropriate manner and is here illustrated with an annular recess 32 into which a deformed portion of the housing 24 is depressed. A generally cylindrical base 34 is similarly mounted in a central portion of the housing 24 and divides the housing into two isolated areas. An aperture 36 in the aircraft portion 20 opens into the lower area of the release mechanism 18 and is adapted to receive the arming wire 16. Extending downwardly from the base 34 is a fixed post 38 and adjacent to the fixed post 38 is an aperture of substantial diameter in the base member having a pivotally mounted post 40 extending therethrough. The post 40 is pivotally mounted on transverse pin 42 and is normally maintained substantially parallel to the fixed post 38. The post 40 has a substantially cylindrical recess 44 formed therein adapted to receive a ball or similar protuberance 46 between the recess 44 and the fixed post 38. The ball 46 will normally be maintained against the fixed post 38 by a flat spring 48 shaped to exert an outwardly directed force against the upper end of the pivotally mounted post 40. The spring 48 has one shaped end in engagement with the pin 50 mounted on a stop 52 above the base 34. The other end of the flat spring 48 has a shaped portion in engagement with a pin 54 mounted on the upper end of the pivotally mounted post 40. The spring 48 is continuously urging the pins 50 and 54 apart, thus resiliently retaining the ball 46 between the lower end of the post 40 and the post 38. A resilient insert 56 fills the portion of the aperture in base 34 which is not occupied by the pivotally mounted post 40, thus isolating the lower area of the housing from the upper area thereof. As the lower area is exposed to climatic conditions because of the aperture 36 provided for the passage of arming wire 16, it is desirable to protect the upper mechanism from exposure wherever possible.

As thus far described, the arming wire may be inserted into the release mechanism 18 to assume the position shown in Fig. 2. However, to prevent withdrawal of the arming wire 16 from the area 58 it is desirable to lock the pivotally mounted post 40 to prevent movement thereof. For this purpose a pin 60 is mounted for reciprocation between a position intermediate the stop 52 and the post 40 and a position removed therefrom. When in the actuated position illustrated in Fig. 2 the pin 60 is in engagement between a pair of rollers 62 and 64. The roller 62 is mounted on pin 50 and fixed relative to the base 34 while the roller 64 is mounted on pin 54 and thus movable with the upper end of post 40. Thus, when pin 60 is in the downward position illustrated in Fig. 2 the roller 64 is forced outwardly whereby the ball 46 is rigidly clamped between the posts 40 and 38 absolutely preventing removal of the arming wire and thus insuring arming of the missile 10 when it is released.

The pin 60 has a solenoid armature 66 secured to its upper end and the pin and armature are normally urged upwardly by a coil spring 68. Energization of the coil 70 of solenoid 28 will draw the armature 66 downwardly to the position shown in Fig. 2 against the force of spring 68, thus positioning the pin as illustrated in Fig. 2 and locking the arming mechanism. A pair of conductors 72 and 74 are connected from the free ends of the coil 70 to a pair of terminals 76 and 78 providing externally accessible connecting means whereby the mechanism of this invention may be remotely energized. The embodiment of Fig. 2 is illustrated in the deenergized position in Fig. 3. Therein it will be seen that the armature 66 and associated pin 60 have been withdrawn upwardly under the influence of coil spring 68 whereby the pivotally mounted arm 40 is free to move in response to forces applied thereto. In the event that the bomb 10 is released while the mechanism 18 is in this condition, the arming wire 16 will be withdrawn downwardly and the force exerted by flat spring 48 will be insufficient to maintain the ball 46 in the position shown by dotted lines 46a. Thus the arming wire 16 will shift the ball 46 to the position shown in Fig. 3 causing the pivotally mounted post 40 to be shifted in a clockwise direction.

In the event that the post 40 does not immediately return to the normal substantially vertical position following the release of the arming wire 16, the ball 46 may begin to fall under the force of gravity to the dotted line position. This, however, will not adversely effect operation of the device as the post 40 will subsequently position the ball in the recess 44. The lower end of post 40 has a spade-like shape as illustrated best in Fig. 1. This provides a better seat for the ball 46. The utilization of a ball as the locking element provides enhanced versatility in the arming mechanism of this invention in that the arming wire 16 may be withdrawn from the device from any angle whatsoever.

When the missile 10 has been mounted on the hooks 12 and the arming wire 16 positioned above the sphere 46, the solenoid 28 may be energized. Energization of solenoid 28 causes the core 66 and pin 60 to move downwardly to the position shown in Fig. 2. As shown therein, the pin 60 is so oriented that one edge thereof rolls along the roller 62 while the other side thereof forces the roller 64 outwardly, thus pivoting post 40 in such a manner that the sphere 46 is rigidly clamped between the fixed post 38 and the recessed portion 44 of post 40.

When the parts are positioned as illustrated in Fig. 2, a very substantial force is required to withdraw the loop 16 from above the sphere 46 and, in the event that the missile 10 is released while the solenoid 28 is energized, the arming wire will be retained by the release mechanism and consequently withdrawn from the missile. The missile 10 is thus armed for explosion upon impact or the like.

In one particular embodiment of this invention the spring 48 and other components are so selected that a force of from 2 to 8 pounds applied downwardly on the arming wire 16 is sufficient to force the ball 46 outwardly permitting the release of the arming wire 16 without arming or setting the fuse of the missile 10. In said embodiment the force necessary to remove the arming wire 16 from the retained position above the ball 46 when the mechanism is locked by the energization of solenoid 28 whereby the pin 60 is disposed between the rollers 62 and 64 is in excess of 100 pounds.

By this invention a pilot or other operator may alternately set and withdraw the pin 60 by energizing and deenergizing the solenoid 28 any number of times without danger that the arming wire 16 will slip from its normal position as shown in Fig. 1. As the ball 46 is freely retained between the fixed post 38 and the recess 44, the arming wire 16 will not fall from its normal position when the solenoid is deenergized. This is believed to be a substantial advantage as tactical requirements may cause a change in planning at several points during a mission in which it would be desirable to alter the condition of the arming release mechanism whereby it will arm or fail to arm the missile when it is released.

Various modifications will immediately appear to one skilled in this art and all of the modifications are believed to be within the spirit and scope of this invention. For example, as mentioned above, the pin 24 may be shifted by any means either directly controlled or remotely actuated. Furthermore, while a spherical ball is herein shown as the retaining element for the arming wire, it is believed clear that many appropriate members could be substituted therefor.

Without further elaboration, the foregoing will so fully explain the character of my invention that others may, by applying current knowledge, readily adapt the same for use under varying conditions of service, while retaining certain features which may properly be said to constitute the essential items of novelty involved, which items are intended to be defined and secured to me by the following claims.

I claim:

1. An arming wire loop release mechanism comprising a cylindrical housing, a base transversely and centrally located in said housing and having an aperture therethrough, post means extending through said aperture and pivotally mounted to said base, one end of said post means having a generally spherical recess therein, an elastic seal filling said aperture and resiliently maintaining said post in alignment with the axis of said housing, a fixed post extending from said base in spaced generally coextensive relationship with said recessed end, substantially spherical means disposed between said fixed post and said recessed end, stop means extending from said base in spaced generally coextensive relationship with the other end of said pivoted post means, and pin means mounted for movement between a position intermediate said stop means and said other end of the pivoted post, wherein said recessed end, said spherical means, and said fixed post are rigidly maintained in juxtaposition with said arming wire loop passing thereabout, and a position removed from said other end whereby said pivoted post is movable to a position in which said recessed portion is spaced from the fixed post and said spherical means is freely maintained therebetween for yieldably maintaining said arming wire loop thereabout.

2. An arming wire loop release mechanism comprising a cylindrical housing, a base transversely and centrally located in said housing and having an aperture therethrough, post means extending through said aperture and pivotally mounted to said base, one end of said post means having a generally spherical recess therein, an elastic seal filling said aperture and resiliently maintaining said post in alignment with the axis of said housing, a fixed post extending from said base in spaced generally coextensive relationship with said recessed end, substantially spherical means disposed between said fixed post and said recessed end, stop means extending from said base in spaced generally coextensive relationship with the other end of said pivoted post means, pin means slidably mounted in said housing, and motive means for effecting movement of said pin means between a position intermediate said stop means and said other end of the pivoted post, wherein said recessed end, said spherical means, and said fixed post are rigidly maintained in juxtaposition with said arming wire loop passing thereabout, and a position removed from said other end whereby said pivoted post is movable to a position in which said recessed portion is spaced from the fixed post and said spherical means is freely maintained therebetween for yieldably maintaining said arming wire loop thereabout.

3. The release mechanism of claim 2 wherein the motive means comprises a solenoid mounted on one end of said housing with the core thereof operatively engaging said pin means.

4. The release mechanism of claim 2 wherein the motive means comprises a solenoid mounted on one end of said housing with the core thereof operatively connected to the pin means, and resilient means urging said pin means to the latter position removed from said other end.

5. The release mechanism of claim 4 wherein resilient means is provided to normally urge said recessed end of said pivotally mounted post toward said fixed post.

6. A release mechanism comprising a base, post means pivotally mounted on said base, one end of said post means being substantially spherically recessed, a fixed post extending from said base generally coextensive with said recessed end, substantially spherical means disposed between said fixed post and said recessed end, stop means extending from said base substantially coextensive with the other end of said pivoted post means, pin means mounted for movement between a position intermediate said stop means and said other end of the pivoted post, wherein said recessed end, said spherical means, and said fixed post are rigidly maintained in juxtaposition, and a position removed from said other end whereby said pivoted post is movable to a position in which said recessed portion is spaced from the fixed post and said spherical means is freely maintained therebetween, solenoid means operatively connected to said pin means to move said pin means to the first position intermediate said stop means and said other end, and spring means urging said pin means to said latter position removed from said stop means and said other end.

7. A release mechanism comprising a base, post means pivotally mounted on said base, one end of said post means being substantially spherically recessed, a fixed post extending from said base generally coextensive with said recessed end, substantially spherical means disposed between said fixed post and said recessed end, stop means extending from said base substantially coextensive with the other end of said pivoted post means, roller means mounted on said stop means and said other end of the pivoted post, pin means mounted for movement between a position intermediate said rollers, wherein said recessed end, said spherical means, and said fixed post are rigidly maintained in juxtaposition, and a position removed from said rollers whereby said pivoted post is movable to a position in which said recessed portion is spaced from the fixed post and said spherical means is freely maintained therebetween, solenoid means operatively connected to said pin means to move said pin means to the first position intermediate said stop means and said other end, and spring means urging said pin means to said latter position removed from said stop means and said other end.

References Cited in the file of this patent

UNITED STATES PATENTS

| | | |
|---|---|---|
| 1,385,598 | Weed | July 26, 1921 |
| 1,522,792 | Russel et al. | Jan. 13, 1925 |
| 1,880,122 | Cooke | Sept. 27, 1932 |
| 2,341,457 | Markey et al. | Feb. 8, 1944 |
| 2,424,618 | Jones et al. | July 29, 1947 |
| 2,430,617 | Quinnell et al. | Nov. 11, 1947 |

FOREIGN PATENTS

| | | |
|---|---|---|
| 79,538 | Austria | Dec. 29, 1919 |
| 285,376 | Great Britain | May 31, 1928 |
| 343,265 | Italy | Sept. 19, 1936 |